United States Patent [19]

Brunerye

[11] Patent Number: 5,613,668
[45] Date of Patent: Mar. 25, 1997

[54] HYDRAULIC ANTIVIBRATION SLEEVE, AND ITS METHOD OF MANUFACTURE

[75] Inventor: Philippe Brunerye, Courbevoie, France

[73] Assignee: Hutchinson, Paris, France

[21] Appl. No.: 599,924

[22] Filed: Feb. 12, 1996

[30] Foreign Application Priority Data

Feb. 13, 1995 [FR] France ................... 95 01625

[51] Int. Cl.$^6$ .................................................. B60G 15/00
[52] U.S. Cl. ................. 267/219; 267/140.12; 267/141.2
[58] Field of Search ............................ 267/219, 140.12, 267/140.13, 141.2, 141.3, 141.4, 141.6, 152, 293; 248/562, 636

[56] References Cited

U.S. PATENT DOCUMENTS

| 4,768,760 | 9/1988 | Le Fol. | |
| 5,305,991 | 4/1994 | Rudolph | 267/140.12 |

FOREIGN PATENT DOCUMENTS

| 0359655 | 3/1990 | European Pat. Off.. | |
| 0370524 | 5/1990 | European Pat. Off.. | |
| 0556076 | 8/1993 | European Pat. Off.. | |
| 3831644 | 3/1990 | Germany. | |
| 4305808 | 9/1994 | Germany. | |
| 2211580 | 5/1989 | United Kingdom | 267/140.12 |

*Primary Examiner*—Lee W. Young
*Attorney, Agent, or Firm*—Larson and Taylor

[57] ABSTRACT

The invention relates to a hydraulic antivibration sleeve comprising two tubular rigid strength members, one surrounding the other, the strength members being connected together by an elastomer body which defines two sealed pockets that communicate with each other via two narrow channels, the two pockets and the narrow channels being filled with liquid. The elastomer body is molded and bonded onto the two strength members, and each sealed pocket is constituted by a blind hole formed inside the elastomer body and opening out to one of the ends of the body, the elastomer body further including a collar which extends outwards from the inner strength member and which is fixed in sealed contact against a flange of the outer strength member, thereby closing the two pockets and the narrow channels.

7 Claims, 1 Drawing Sheet

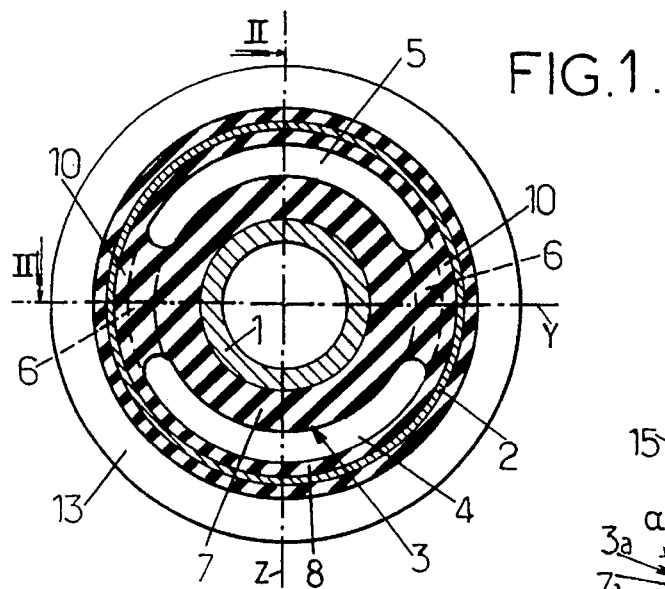
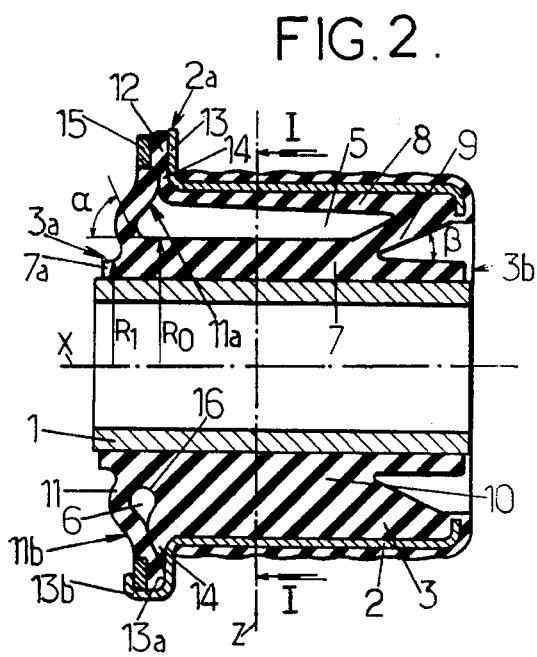
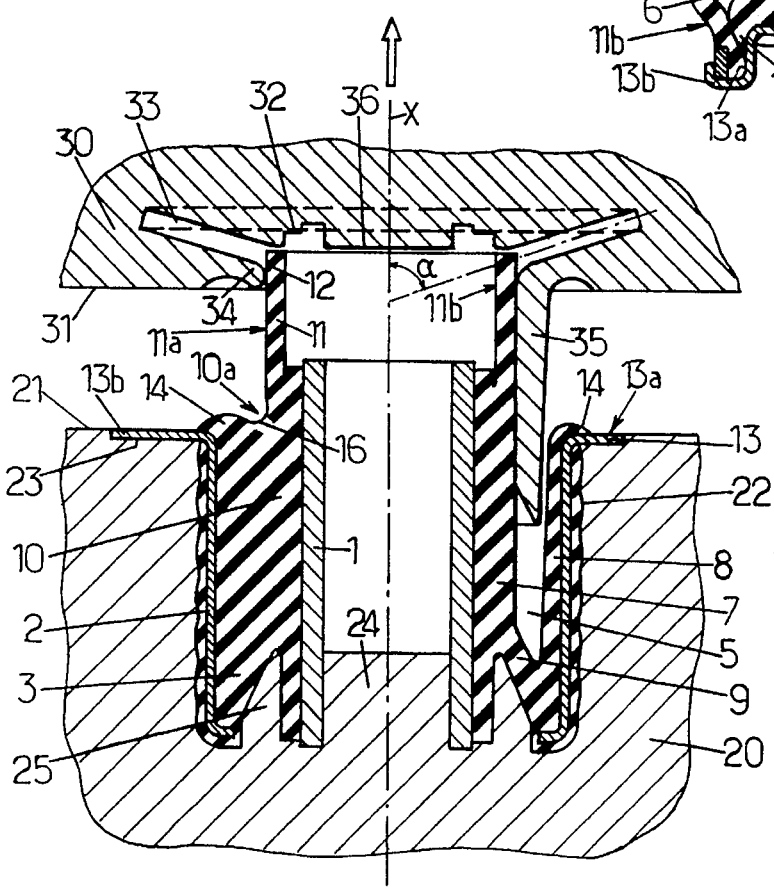

HYDRAULIC ANTIVIBRATION SLEEVE, AND ITS METHOD OF MANUFACTURE

The invention relates to hydraulic antivibration sleeves and to their methods of manufacture.

BACKGROUND OF THE INVENTION

More particularly, the invention relates to a hydraulic antivibration sleeve comprising two tubular rigid strength members one surrounding the other, namely an inner strength member and an outer strength member having respective longitudinal axes parallel to a common axial direction and interconnected by an elastomer body, the antivibration sleeve including at least two sealed pockets fully defined by the elastomer body and the two strength members, said sealed pockets being disposed between the two strength members and communicating with each other via at least one narrow channel, the two pockets and the narrow channel together being filled with a liquid, the elastomer body extending axially between first and second ends, the elastomer body including an inner annular portion molded on and bonded to the inner strength member and an outer annular portion in contact with the outer strength member, and the elastomer body further including at least two solid portions angularly separating the pockets from one another.

An example of such a hydraulic antivibration sleeve is given in document EP-A-0 359 655.

Hydraulic antivibration sleeves of the kind in question suffer from the drawback of requiring complex molds having two radially-moving shells and two portions that move axially. This gives rise firstly to high cost molding and secondly to productivity which is limited by the small number of mold cavities that can be provided in the same mold.

Also, hydraulic antivibration sleeves of the kind in question include a perforated metal cage on which the outer annular portion of the elastomer body is molded and bonded, the outer tubular strength member being fitted around the perforated cage after the elastomer body has been molded.

The perforated cage is a metal part of relatively complex shape and is therefore expensive, and it also increases the weight of the hydraulic antivibration sleeve.

OBJECTS AND SUMMARY OF THE INVENTION

A particular object of the present invention is to mitigate those drawbacks.

To this end, according to the invention, essentially in a hydraulic antivibration sleeve of the kind in question:

- the outer annular portion of the elastomer body is molded on the outer strength member and is bonded to said member, each sealed pocket being constituted by a blind hole formed inside the elastomer body, opening out at the first end of the elastomer body and extending axially inside the elastomer body from said first end towards the second end of said elastomer body, the hole being limited axially towards the second end of the elastomer body by a thin wall belonging to said elastomer body and extending continuously between the inner and outer annular portions of the elastomer body;
- the inner annular portion of the elastomer body is extended peripherally in the vicinity of the first end of said elastomer body by a thin elastomer collar which extends substantially radially from a peripheral edge and which presents an inside face facing the sealed pockets and an outside face facing away from the sealed pocket;
- the outer strength member of the sleeve includes, in the vicinity of the first end of the elastomer body, an axial end that forms a flange extending said strength member peripherally outwards and having a contact face facing the elastomer collar; and
- the inside face of the elastomer collar is peripherally secured in sealed manner via the peripheral edge of the collar to the contact face of the flange of the outer strength member, thereby closing in sealed manner the two pockets and the narrow channel, which channel is defined firstly by the elastomer collar and secondly by one of the solid portions of the elastomer body angularly separating the pockets.

The elastomer body can thus be molded simply by means of a mold having two portions that move axially relative to each other, the elastomer collar being molded in an undercut and being temporarily turned out to form a skirt extending parallel to the axial direction during unmolding of the elastomer body.

The invention thus makes it possible to use a mold that is simpler and cheaper than prior art molds.

In addition, because it is simple, the mold can include a large number of mold recesses, which makes it possible to increase productivity considerably when manufacturing hydraulic antivibration sleeves of the invention.

Furthermore, because the outer tubular strength member is no longer a part fitted to the outside of the elastomer body after molding, but is a part secured to the elastomer body during molding itself, there is no longer any need to use a perforated metal cage for reinforcing the outer annular portion of the elastomer body, thereby making it possible simultaneously to reduce the weight and the cost of the hydraulic antivibration sleeve of the invention.

In preferred embodiments of the above-defined hydraulic antivibration sleeve, use is made of one or more of the following dispositions:

- the peripheral edge of the elastomer collar is clamped axially between a rigid washer and the contact face of the flange of the outer strength member, the flange of the outer strength member having portions which are folded over the rigid washer to crimp said washer in place;
- the inside face of the elastomer collar extends substantially radially outwards from a circular zone having a radius R0, and the outside face of the elastomer collar extends substantially radially outwards from a circular zone having a radius R1 that is smaller than the radius R0;
- the elastomer collar has a thickness that is not greater than the difference R0–R1;
- the elastomer collar has a radially inner portion substantially forming a truncated cone that flares towards the second end of the elastomer body and that has a half-angle at the apex lying in the range 70° to 90°;
- the peripheral edge of the elastomer collar is not expanded radially; and
- each thin wall of the elastomer body axially limiting a sealed pocket towards the second end of the elastomer body is substantially in the form of a portion of a truncated cone flaring towards the second end of the elastomer body.

The invention also provides a method of manufacturing a hydraulic antivibration sleeve as defined above, comprising a step of molding the elastomer body on the two tubular strength members by means of a mold made up of two portions displaceable in translation relative to each other parallel to the axial direction, said portions being referred to respectively as a first portion and a second portion, the first mold portion having a join surface into which there opens out a cylindrical mold cavity which receives at least the outer strength member, the second mold portion likewise having a join surface disposed facing the join surface of the first mold portion, with a central mold cavity opening out axially into the join surface of the second mold portion facing the mold cavity of the first mold portion, an annular hollow being formed substantially radially outwardly from the central mold cavity of the second mold cavity to form the elastomer collar in an undercut, and the second mold portion further including at least two fingers projecting axially towards the cavity of the first mold portion and penetrating into said cavity when the two mold portions are moved towards each other, the two fingers then being disposed between the inner and outer strength members to form the sealed pockets of the elastomer body.

In preferred implementations of the method of the invention, use is made of one or more of the following dispositions:

the annular hollow that forms the elastomer collar is entirely in the form of a truncated cone flaring away from the first mold portion and having a half-angle at the apex lying in the range 70° to 90°; and the method further includes a step consisting in folding the elastomer collar down against the contact face of the flange of the outer strength member, and then in securing the flange peripherally in sealed manner to the elastomer collar, without radially expanding the peripheral edge of said collar.

BRIEF DESCRIPTION OF THE DRAWING

Other characteristics and advantages of the invention appear from the following detailed description of an embodiment thereof given by way of non-limiting example and described with reference to the accompanying drawing.

In the drawing:

FIG. 1 is a cross-section through a hydraulic antivibration sleeve embodying the invention, the section being on line I—I of FIG. 2;

FIG. 2 is a longitudinal section of the FIG. 1 sleeve, the section being on line II—II of FIG. 1; and FIG. 3 is a section similar to FIG. 2, during unmolding of the elastomer body of the hydraulic antivibration sleeve.

In the figures, the same references designate items that are identical or similar.

MORE DETAILED DESCRIPTION

In known manner, the hydraulic antivibration sleeve shown in FIGS. 1 and 2 comprises:

a tubular inner metal strength member 1 that preferably has a solid wall, and that is circularly symmetrical about an axis X;

a tubular outer metal strength member 2 that preferably has a solid wall, that is circularly symmetrical about the axis X, or more generally is circularly symmetrical about an axis parallel to the axis X; and an elastomer body 3 connecting the two strength members 1 and 2 together and forming between them two sealed pockets 4 and 5 that are diametrically opposite in a direction Z perpendicular to the axis X.

The two sealed pockets 4 and 5 are interconnected via two narrow channels 6, or more generally via at least one narrow channel 6.

The two pockets 4 and 5 and the two narrow channels 6 are filled with a liquid enabling the sleeve to perform its vibration-damping function.

The two strength members 1 and 2 are designed to be secured to two rigid parts that are to be united: for example the inner member 1 may be designed to be secured to a pin (not shown) received therein and in contact therewith, while the outer member 2 may be deigned to be secured to a bearing (not shown), with the pin and the bearing themselves being secured respectively to two rigid elements between which it is desired to install the antivibration support, which rigid elements may be the engine and the chassis of a vehicle.

When oscillation at a relatively low frequency, of the order of 10 Hz to 50 Hz, is applied in the diametral direction Z to one of the two strength members 1 and 2 relative to the other, the liquid contained in the antivibration sleeve is urged back and forth at this frequency between the two pockets 4 and 5 via the narrow channels 6.

The liquid moving in the narrow channels 6 serves to damp the oscillations between the two strength members 1 and 2 and to attenuate the amplitude of the oscillations of one of the strength members relative to the other, with this effect occurring in particular over a range of frequencies situated in the vicinity of a given frequency that depends on the dimensions of the narrow channels 6 and that corresponds to a resonance effect in the columns of liquid present in the channels.

The invention makes it possible to provide such a hydraulic antivibration sleeve in a manner that is particularly simple.

In the invention, the elastomer body 3 extends axially between a first end 3a and a second end 3b. It has an inner annular portion 7 which is molded on and bonded to the inner strength member 1, and an outer annular portion 8 which is molded on and bonded to the outer strength member 2.

Each sealed pocket 4 and 5 is constituted by a blind hole formed inside the elastomer body 3.

Each blind hole opens out at the first end 3a of the elastomer body and it extends axially inside the elastomer body from the first end 3a towards the second end 3b of the elastomer body, as far as a thin wall 9 that also belongs to the elastomer body.

The thin wall 9 of elastomer determines the axial limit of the corresponding sealed pocket towards the second end 3b of the elastomer body, and it extends continuously between the inner and outer annular portions 7 and 8 of the elastomer body.

In the example shown, each thin wall 9 is substantially in the form of a truncated cone flaring towards the second end 3b of the elastomer body, and having a half-angle at the apex lying in the range 20° to 60°, for example, and advantageously in the range 20° to 30°, so as to facilitate deformation of said thin wall when the two tubular strength members 1 and 2 are subjected to relative displacement along the direction Z.

In addition, the inner and outer annular portions 7 and 8 of the elastomer body 3 are also connected together by two solid portions 10 that are opposite and that lie on a diametral direction Y perpendicular to the direction Z, these solid portions separating the two pockets 4 and 5 from each other.

Also, in the vicinity of the first end 3a of the elastomer body, the inner annular portion 7 of said elastomer body extends peripherally in the form of a thin elastomer collar 11 which extends substantially radially to a peripheral edge 12, this thin collar 11 having an inside face 11a facing the sealed pockets 4 and 5, and an outside face 11b facing away from the sealed pocket.

In the vicinity of the first end 3a of the elastomer body, the outer strength member 2 includes an axial end 2a that forms a flange 13 extending said member 2 peripherally outwardly and having a contact face 13a facing the elastomer collar 11.

The periphery of the inside face 11a of the elastomer collar is applied in sealed manner against the contact face 13a of the flange 13, and preferably also against the layer 14 of elastomer that covers the contact face 13a of the flange, at least in part. For this purpose, a rigid washer 15, in particular one made of metal, is applied to the periphery of the outside face 11b of the collar and the washer is clamped axially against the collar 11 by means of tabs 13b projecting outwardly from the flange 13 and which are distributed angularly around the flange, the tabs 13b being crimped over the washer 15.

Instead of including tabs 13b, the flange 13 could optionally have its entire periphery folded over the top of the washer 15.

The thin elastomer collar 11 thus closes the two pockets 4 and 5 in sealed manner and also closes the narrow channels 6, both of which are defined firstly by the elastomer collar 11 and secondly by the axial face 10a of a respective solid portion 10 of the elastomer body.

The section of each narrow channel 6 is thus determined by the shape of the elastomer collar 11 and by the shape of the axial faces 10a of the two solid portions 10 of the elastomer body.

In the example shown in the drawing, the axial faces 10a of the solid portions 10 of the elastomer body include respective grooves 16 extending angularly between the two pockets 4 and 5, while the elastomer collar 11 has a radially inner portion substantially in the form of a truncated cone having a half-angle at the apex $\alpha$ which may be about 80°, for example, so that the radially inner portion of the collar 11 keeps off the faces 10a of the solid portions 10 of the elastomer body in the vicinity of the grooves 16, thereby forming the two narrow channels 6.

It has been observed experimentally that the sections of the narrow channels 6 obtained in this way are sufficiently accurate to obtain satisfactory performance of the hydraulic antivibration sleeve.

In a variant, the narrow channels 6 could be formed solely by the grooves 16 in the faces 10a of the solid portions 10 of the elastomer body, with the elastomer collar 11 extending radially only from its inner end.

In another variant, the faces 10a of the solid portions 10 of the elastomer body could be substantially plane, with the sections of the narrow channels 6 then being determined by the shape of the collar 11.

In a less preferred variant, it would be possible to provide a single narrow channel 6 between the two pockets 4 and 5, said narrow channel being disposed between the collar 11 and the face 10a of one of the two solid portions 10 of the elastomer body, while the face 10a of the other solid portion 10 of the elastomer body is shaped so as to bear in substantially leakproof manner against the collar 11.

As shown in FIG. 3, the elastomer body 3 of the hydraulic antivibration sleeve of the invention can be made by molding in a mold comprising two portions 20 and 30 that are movable relative to each other in translation parallel to the axis X.

The first mold portion 20 includes a join surface 21 that is generally plane and into which there opens out a hollow cylindrical mold recess 22 that is generally open in an upwards direction and that is surrounded by a facing 23.

The outer strength member 2 is received, preferably with clearance, inside the recess 22 so that said strength member 2 is substantially embedded in the elastomer body, the member being held by its flange 13 which is received without clearance in the facing 23, and with the tabs 13b of the flange 13 then being in the unfolded condition.

The inner strength member 1 is also held inside the recess 22, e.g. by means of a cylindrical stud 24 projecting axially from the bottom of the recess 22 and suitable for being received without clearance inside the inner strength member 1.

Finally, a ring 25 also projects axially from the bottom of the recess 22, around the stud 24 so as to shape the second axial end 3b of the elastomer body.

The second mold portion 30 includes a join surface 31 parallel to the join surface 21 of the first mold portion, and it has a hollow central recess 32 that opens out downwards in said join surface 21 facing the recess 22 of the first mold portion.

From said central recess 32, an annular hollow 33 is formed in the second mold portion 30 extending substantially radially outwards, and more precisely having a frustoconical shape with a half-angle at the apex $\alpha$ lying in the range 70° to 90°, being equal to about 80°, for example, as to form the elastomer collar 11.

The annular hollow 33 is separated axially from the join surface 31 by an annular rim 34 which preferably does not have any sharp edges.

The radially inner portion of the annular rim 34 is axially extended towards the mold recess 22 by two axial fingers 35 which penetrate between the strength members 1 and 2 when the two mold portions 20 and 30 are moved axially towards each other, for the purpose of forming the two sealed pockets 4 and 5.

Finally, the second mold portion 30 preferably includes a stud 36 projecting from the end wall of its recess 32 and suitable for engaging with substantially no clearance inside the inner strength member 1.

To make the elastomer body 3, the two mold portions 20 and 30 are moved towards each other until their join surfaces 21 and 31 come into contact, after which an elastomer is injected in the fluid state between the strength members 1 and 2 via an injection orifice (not shown).

The elastomer penetrates throughout the volume of the mold recesses in the two mold portions 20 and 30, after which it is subjected to vulcanization.

During vulcanization, the elastomer is also bonded to the strength members 1 and 2 which are previously subjected to chemical surface treatment for this purpose.

After vulcanization and bonding of the elastomer body 3, the two mold portions 20 and 30 are moved apart from each other axially to unmold the elastomer body 3.

During unmolding, the elastomer collar 11 which has been molded in an undercut constituted by the annular hollow 33 in the second mold portion 30 is folded out like a skirt extending substantially parallel to the axis X so as to allow the annular rim 34 and the axial fingers 35 to move past it, after which it returns to its frustoconical shape.

To make such folding possible, the inside face 11a of the collar preferably has an inner radius R0 which corresponds to the radius of the inner annular portion 7 of the elastomer body inside the sealed pockets 4 and 5, and which is greater than the inner radius R1 of the outside face 11b of the collar, the radius R1 corresponding to the outside radius of a part 7a protecting from the inner annular portion 7 of the elastomer body level with the first end 3a of said elastomer body.

The difference between the radii R0 and R1 is preferably substantially equal at least to the thickness of the elastomer collar 11, or at very least to half said thickness.

Thus, the radially inner portion of the elastomer collar is not excessively compressed and there is no tendency for it to be torn off by the annular rim 34 and the axial fingers 35 during unmolding.

The part 7a of the inner portion 7 of the elastomer body may optionally be omitted, in which case the radius R1 becomes equal to the outside radius of the inner strength member 1, regardless of whether the inner strength member projects or does not project relative to the first axial end 3a of the elastomer body.

After unmolding, the elastomer collar 11 is folded down against the flange 13 of the outer strength member 2 and it is fixed to said flange by means of the washer 15 and the tabs 13b, without radially expanding the peripheral edge 12 of the collar so as to avoid creating any traction stresses in the collar.

The substantially frustoconical shape of the radially inner portion of the collar 11 is defined by the initial frustoconical shape of said collar.

After being folded down against the flange 13, the collar 11 also forms an annular fold that acts as a bellows which can facilitate deformation of the collar 11 where it overlies the pockets 4 and 5 during relative movement between the strength members 1 and 2 along the direction Z.

I claim:

1. A hydraulic antivibration sleeve comprising two tubular rigid strength members one surrounding the other, namely an inner strength member and an outer strength member having respective longitudinal axes parallel to a common axial direction and interconnected by an elastomer body, the antivibration sleeve including at least two sealed pockets fully defined by the elastomer body and the two strength members, said sealed pockets being disposed between the two strength members and communicating with each other via at least one narrow channel, the two pockets and the narrow channel together being filled with a liquid, the elastomer body extending axially between first and second ends of said elastomer body the elastomer body including an inner annular portion molded on and bonded to the inner strength member and an outer annular portion in contact with the outer strength member, and the elastomer body further including at least two solid portions angularly separating the pockets from one another, wherein:

the outer annular portion of the elastomer body is molded on the outer strength member and is bonded to said outer member, each sealed pocket being constituted by a blind hole formed inside the elastomer body, opening out at the first end of the elastomer body and extending axially inside the elastomer body from said first end towards the second end of said elastomer body, the hole being limited axially towards the second end of the elastomer body by a thin wall of said elastomer body and said thin wall extending continuously between the inner and outer annular portions of the elastomer body;

the inner annular portion of the elastomer body is extended peripherally in the vicinity of the first end of said elastomer body by a thin elastomer collar which extends substantially radially up to a peripheral edge of said collar and which presents an inside face facing the sealed pockets and an outside face facing away from the sealed pocket;

the outer strength member of the sleeve includes, in the vicinity of the first end of the elastomer body, an axial end that forms a flange extending said strength member peripherally outwards and having a contact face facing the elastomer collar; and the inside face of the elastomer collar is peripherally secured in sealed manner via the peripheral edge of the collar to the contact face of the flange of the outer strength member, thereby closing in sealed manner the two pockets and the narrow channel, which channel is defined firstly by the elastomer collar and secondly by one of the solid portions of the elastomer body angularly separating the pockets.

2. A hydraulic antivibration sleeve according to claim 1, in which the peripheral edge of the elastomer collar is clamped axially between a rigid washer and the contact face of the flange of the outer strength member, the flange of the outer strength member having portions which are folded over the rigid washer to crimp said washer in place.

3. A hydraulic antivibration sleeve according to claim 1, in which the inside face of the elastomer collar extends substantially radially outwards from the elastomer body at a radius R0, and the outside face of the elastomer collar extends substantially radially outwards from the elastomer body at a radius R1 that is smaller than the radius R0.

4. A hydraulic antivibration sleeve according to claim 3, in which the elastomer collar has a thickness that is not greater than the difference between R0 and R1.

5. A hydraulic antivibration sleeve according to claim 1, in which the elastomer collar has a radially inner portion substantially forming a truncated cone that flares towards the second end of the elastomer body and that has a half-angle at the apex lying in the range 70° to 90°.

6. A hydraulic antivibration sleeve according to claim 1, in which the peripheral edge of the elastomer collar is not expanded radially.

7. A hydraulic antivibration sleeve according to claim 1, in which each thin wall of the elastomer body axially limiting the sealed pocket towards the second end of the elastomer body is substantially in the form of a portion of a truncated cone flaring towards the second end of the elastomer body.

* * * * *